United States Patent
Dou et al.

(10) Patent No.: US 11,442,199 B2
(45) Date of Patent: Sep. 13, 2022

(54) OPTICAL FILM, MANUFACTURING METHOD, AND APPLICATION THEREOF

(71) Applicant: TCL CHINA STAR OPTOELECTRONICS TECHNOLOGY CO., LTD, Guangdong (CN)

(72) Inventors: Hu Dou, Guangdong (CN); Ziping Wu, Guangdong (CN); Gang Yu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 163 days.

(21) Appl. No.: 16/976,826

(22) PCT Filed: May 29, 2020

(86) PCT No.: PCT/CN2020/093365
§ 371 (c)(1),
(2) Date: Aug. 31, 2020

(87) PCT Pub. No.: WO2021/232481
PCT Pub. Date: Nov. 25, 2021

(65) Prior Publication Data
US 2021/0364671 A1    Nov. 25, 2021

(30) Foreign Application Priority Data

May 21, 2020 (CN) .......................... 202010437443.2

(51) Int. Cl.
*G02B 1/04* (2006.01)
*G02F 1/03* (2006.01)
(Continued)

(52) U.S. Cl.
CPC ................. *G02B 1/04* (2013.01); *G02B 1/10* (2013.01); *G02F 1/0045* (2013.01);
(Continued)

(58) Field of Classification Search
CPC ............... G02F 1/1347; G02F 1/13476; G02F 1/133504; G02F 1/133606;
(Continued)

(56) References Cited

U.S. PATENT DOCUMENTS

| 10,816,870 | B2 | 10/2020 | Kim |
| 2006/0246229 | A1 | 11/2006 | Suemasu |
| 2017/0059876 | A1* | 3/2017 | Kim .................. G02B 30/27 |

FOREIGN PATENT DOCUMENTS

| CN | 1166209 A | 11/1997 |
| CN | 1869741 A | 11/2006 |

(Continued)

*Primary Examiner* — Edward J Glick
*Assistant Examiner* — David Y Chung
(74) *Attorney, Agent, or Firm* — Mark M. Friedman

(57) ABSTRACT

An optical film can be used in a display panel as a viewing angle diffusion film. The optical film includes a first electrode layer, an isotropic optical material layer, a liquid crystal material layer and a second electrode layer that are stacked. A plurality of groove structures are disposed on the isotropic optical material layer, and each of the groove structures is filled with the liquid crystal material layer.

18 Claims, 4 Drawing Sheets

(51) Int. Cl.
  *G02F 1/1333*   (2006.01)
  *G02F 1/1337*   (2006.01)
  *G02F 1/00*   (2006.01)
  *G02B 1/10*   (2015.01)

(52) U.S. Cl.
  CPC ...... *G02F 1/0316* (2013.01); *G02F 1/133302* (2021.01); *G02F 1/133374* (2021.01); *G02F 1/133711* (2013.01); *G02F 2201/12* (2013.01); *G02F 2201/44* (2013.01); *G02F 2202/023* (2013.01); *G02F 2202/16* (2013.01)

(58) Field of Classification Search
  CPC ......... G02F 1/133607; G02F 1/133374; G02F 1/133302; G02F 1/0045; G02F 1/0316; G02F 1/133711; G02F 2201/12; G02F 2201/44; G02F 2202/023; G02F 2202/16; G02B 1/04; G02B 1/10
  USPC ........................................................ 349/112
  See application file for complete search history.

(56)  References Cited

FOREIGN PATENT DOCUMENTS

| | | | | |
|---|---|---|---|---|
| CN | 106094068 A | * | 11/2016 | ......... G02B 27/2214 |
| CN | 109633986 A | | 4/2019 | |
| CN | 109683381 A | | 4/2019 | |
| JP | S62237435 A | | 10/1987 | |
| WO | 9918459 A1 | | 4/1999 | |
| WO | 2018150662 A1 | | 8/2018 | |

* cited by examiner

OPTICAL FILM, MANUFACTURING METHOD, AND APPLICATION THEREOF

FIELD OF INVENTION

This present disclosure generally relates to the field of display technology, and in particular to an optical film, method for manufacturing the optical film, and application thereof.

BACKGROUND OF INVENTION

With the rapid development of display technology, high resolution has become a development trend for liquid crystal display (LCD) panels. Since the aperture ratio of the pixel electrode is reduced with an improvement in the resolution of LCDs, the light transmittance is also reduced, thereby negatively affecting the display brightness of the LCD panels with large viewing angles.

In prior art, a viewing angle diffusion film is added on the LCD panel, so as to improve the display brightness under large viewing angles. As shown in FIG. 1, the viewing angle diffusion film is a double-layer composite optical film layer structure, wherein each optical film layer uses isotropic optical materials with different refractive indexes.

Whether in a bright state or a dark state, the existing viewing angle diffusion film can result in viewing angle diffusion. In the bright state, the viewing angle diffusion film has positive effects, and can modulate part of the front-view light to a large viewing angle (such as a 45° viewing angle), so as to effectively improve the display brightness at the large viewing angle; while in the dark state, the light leakage of the LCD panel is severe at a super large viewing angle (a viewing angle over 60°), and the light leakage of the super viewing angle of the LCD panel is originally acceptable because applications of the super large viewing angle are few. However, after the viewing angle diffusion film is added to the LCD panel, under the modulation effect of the optical path of the viewing angle diffusion film, the light leakage of the super viewing angle is modulated to the front-viewing angle, and then aggravates the dark-state light leakage at the front-viewing angle, thereby reducing the contrast ratio of the LCD panel at front-viewing angle. That is to say, the existing viewing angle diffusion film has the positive effect of improving the brightness of the large viewing angle display in the bright state, but has the negative effects, such as aggravating the light leakage in the dark state, and reducing the contrast ratio at front-viewing angle of the LCD panel.

Therefore, it is necessary to invent a new type of viewing angle diffusion film to retain the positive effects and eliminate the negative effects of viewing angle diffusion films in the prior art.

SUMMARY OF INVENTION

The present disclosure provides a new optical film, method for manufacturing the optical film, and application thereof. The optical film can be used as viewing angle diffusion film in LCD panel, then it retains the positive effects improve eliminate the negative effects of viewing angle diffusion films in prior art.

The first object of the present disclosure is to provide an optical film comprising a first electrode layer, an isotropic optical material layer, a liquid crystal material layer, and a second electrode layer that are sequentially stacked; wherein a plurality of groove structures are disposed in the isotropic optical material layer, and each of the groove structures is filled with the liquid crystal material layer; and wherein an ordinary refractive index of the liquid crystal material layer is less than an ordinary refractive index of the isotropic optical material layer, and an extraordinary refractive index of the liquid crystal material layer is equal to an extraordinary refractive index of the isotropic optical material layer.

In some embodiments, the first electrode layer includes a first carrier substrate and a first electrode stacked with each other, and the second electrode layer includes a second carrier substrate and a second electrode stacked with each other.

In some embodiments, the first electrode and the second electrode are transparent conductive films.

In some embodiments, material of the first carrier substrate and the second carrier substrate is transparent glass or transparent plastic.

In some embodiments, the optical film comprises a plurality of support pads, each of which is disposed between two of the groove structures adjacent to each other, and each of the support pads is located between the isotropic optical material layer and the second electrode layer.

In some embodiments, the optical film further comprises a plurality of first alignment films and a second alignment film. Each of the first alignment films is disposed on a bottom surface of one of the groove structures, and the second alignment film is stacked on a surface of the second electrode layer close to the liquid crystal material layer.

In some embodiments, material of the liquid crystal material layer is sematic liquid crystal or blue phase liquid crystal.

In some embodiments, a thickness of the liquid crystal material layer is 5-100 microns.

In some embodiments, material of the isotropic optical material layer is an ultraviolet photosensitive polymer material containing a resin.

In some embodiments, a thickness of the isotropic optical material layer is 10-200 microns.

In some embodiments, the plurality of groove structures are arranged at equal intervals.

In some embodiments, a section of each of the groove structures in a vertical bottom-up direction is an irregular shape having a left half and a right half being symmetrical to each other, and a width of the section of each of the groove structures decreases gradually.

In some embodiments, the section of each of the groove structures includes a first isosceles trapezoid, a second isosceles trapezoid, and a third isosceles trapezoid in the vertical bottom-up direction, wherein a base angle of the second isosceles trapezoid is greater than a base angle of the third isosceles trapezoidal surface, and the base angle of the third isosceles trapezoidal surface is greater than a base angle of the first isosceles trapezoid.

The second object of the present disclosure is to provide a manufacturing method for an optical film, comprising steps of:

providing a first carrier substrate and a second carrier substrate, forming a first electrode on the first carrier substrate to obtain a first electrode layer, and forming a forming a second electrode on the second carrier substrate to obtain a second electrode layer;

forming an isotropic optical material layer on the first electrode layer;

forming a plurality of groove structures in the isotropic optical material layer;

injecting liquid crystal material into each of the groove structures; and fixing the first electrode layer and the second electrode layer on opposite sides to encapsulate the liquid crystal material, such that a liquid crystal material layer is formed and the optical film is constructed.

In some embodiments, before fixing the first electrode layer and the second electrode layer on opposite sides to encapsulate the liquid crystal material, the manufacturing method further comprises: forming a plurality of support pads on the second electrode layer, wherein positions of the support pads respectively correspond to positions of the isotropic optical material layer disposed between the groove structures adjacent to each other.

In some embodiments, before injecting the liquid crystal material into each of the groove structures, the manufacturing method further comprises: forming a first alignment film on a bottom surface of each of the groove structures, and forming a second alignment film on the second electrode layer.

The third object of the present disclosure is to provide a display panel to disclose an application of the optical film described in the first object in a display panel.

The display panel comprises an optical film disposed on a light emitting surface of the display panel; wherein the optical film comprises a first electrode layer, an isotropic optical material layer, a liquid crystal material layer, and a second electrode layer that are sequentially stacked; wherein a plurality of groove structures are disposed in the isotropic optical material layer, and each of the groove structures is filled with the liquid crystal material layer; and wherein an ordinary refractive index of the liquid crystal material layer is less than an ordinary refractive index of the isotropic optical material layer, while an extraordinary refractive index of the liquid crystal material layer is equal to an extraordinary refractive index of the isotropic optical material layer.

In some embodiments, the display panel is LCD panel comprising a first substrate including a plurality of pixels, a second substrate arranged opposite to the first substrate, a liquid crystal layer filled between the first substrate and the second substrate, a first polarizer disposed on a surface of the first substrate away from the liquid crystal layer, a second polarizer disposed on a surface of the second substrate away from the liquid crystal layer; and an optical film described in the first object, wherein the optical film is disposed on a surface of the first polarizer away from the first substrate, and wherein positions of the groove structures in the optical film respectively correspond to positions of the pixels.

In some embodiments, the first substrate is a color film (CF) substrate, and the second substrate is a thin film transistor array (TFT) substrate.

In some embodiments, wherein the display panel has a twisted nematic display mode.

Advantageous Effects

The optical film provided in the present disclosure changes the structure and the composition of the existing viewing angle diffusion film. The existing viewing angle diffusion film has a double-layer structure, and the two layers use different isotropic optical materials with different refractive indexes, The optical film of the present disclosure retains only one isotropic optical material layer, and the other isotropic optical material layer is replaced with a liquid crystal material layer.

The optical film of the present disclosure can be applied to the display panel as the viewing angle diffusion film. The optical film is located on the light emitting surface of the display panel. Some examples of the display panel include LCD panels and non-LCD panels, such as: organic light-emitting diode (OLED) display panel, micro light emitting diode (Micro-LED) display panel, quantum dot light emitting diodes (QLED) display panel, etc. The positive effects of the existing viewing angle diffusion films are retained, while the negative effects of the existing viewing angle diffusion films are eliminated by the optical film of the present disclosure. The manufacturing method of the optical film has the advantages of simple operation and easy industrial production.

When no driving voltage is applied to the optical film, the optical film has no modulating action or only very weak modulating action on the viewing angle, so as to improve the light leakage and the contrast ratio at the front viewing angle of the existing liquid crystal display panel in the dark state. When a driving voltage is applied to the optical film, the optical film has viewing angle modulating action, wherein as the driving voltage increases, the viewing angle modulating action of the optical film becomes strong in order to improve the brightness of the large viewing angle.

The brightness of the LCD panel applied with the optical film is equivalent to the LCD panel applied with the existing viewing angle diffusion film at a front viewing angle (0 degree) to 80 degree. However, compared to the LCD panel applied with the existing viewing angle diffusion film, the contrast ratio of the LCD panel applied with the optical film at a front viewing angle (0 degree) is about doubled, and the optical film greatly improves the light leakage and the contrast ratio at the front viewing angle in dark state.

DETAILED DESCRIPTIONS

To clarify the purposes, technical features and advantages of the present disclosure, the following embodiments will be described more fully hereinafter with reference to the accompanying drawings. Moreover, directional terms described by the present disclosure, such as upper, lower, front, back, left, right, inner, outer, side, etc., are only directions by referring to the accompanying drawings, and thus the used directional terms are used to describe and understand the present disclosure, but the present disclosure is not limited thereto.

Figure 2:
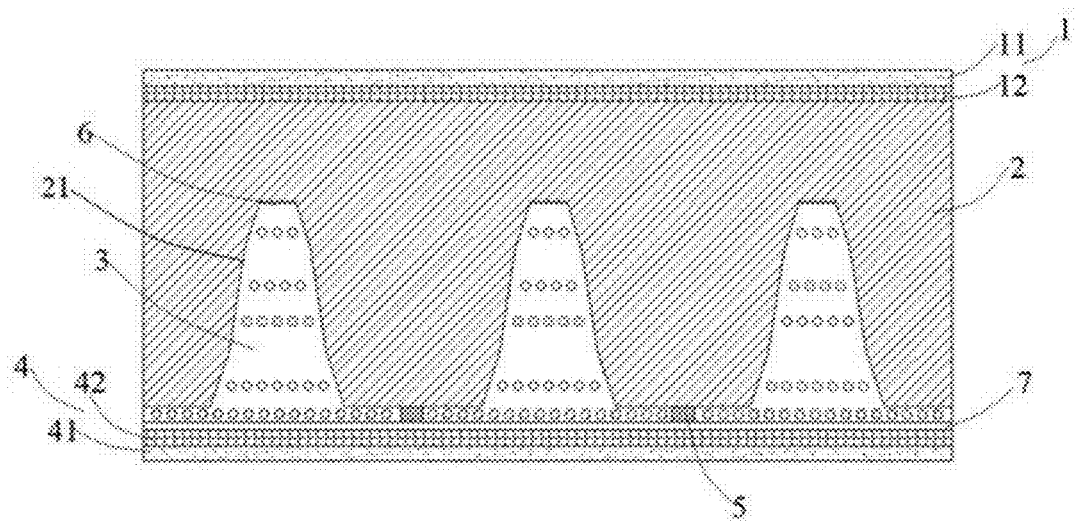
FIG. 2 is a cross-sectional view of an optical film in a longitudinal direction according to one embodiment of the present disclosure.

In one aspect, one embodiment of the present disclosure provides an optical film. As shown in FIG. 2, the optical film comprises a first electrode layer 1, an isotropic optical material layer 2, a liquid crystal material layer 3, and a second electrode layer 4 that are sequentially stacked. A plurality of groove structures 21 are disposed in the isotropic optical material layer 2, and each of the groove structures 21 is filled with the liquid crystal material layer 3. An ordinary refractive index(no) of the liquid crystal material layer 3 is less than an ordinary refractive index(no) of the isotropic optical material layer 2, and an extraordinary refractive index(ne) of the liquid crystal material layer 3 is equal to an extraordinary refractive index(ne) of the isotropic optical material layer 2.

Specifically, material of the isotropic optical material layer 2 is an ultraviolet photosensitive polymer material containing a resin, and material of the liquid crystal material layer 3 is nematic liquid crystal or blue phase liquid crystal. A thickness of the isotropic optical material layer 2 is 10-200 microns. A thickness of the liquid crystal material layer 3 is 5-100 microns. The plurality of groove structures are arranged at equal intervals. In other words, the intervals between adjacent groove structures 21 are equal.

Both the first electrode layer 1 and the second electrode layer 4 include a transparent conductive film. The transparent conductive film is a film that is conductive and with a high transparency in the visible light range. The material of the transparent conductive film can be a metal film, oxide film, polymer film, etc., such as: indium tin Oxides (ITO) film, aluminum doped zinc oxide film, carbon nanotube transparent conductive film, tin dioxide transparent conductive film, etc. An ITO film is preferable in one embodiments of the present disclosure.

The ITO film has the characteristics of strong flexibility and easy processing, and it is easy to deform under the action of heat or force, so the isotropic optical material layer 2 and the liquid crystal material layer 3 cannot be directly formed on the surface of the ITO film. Therefore, the first electrode layer 1 includes a first carrier substrate 11 and a first electrode 12 stacked with each other, and the second electrode layer 4 includes a second carrier substrate 41 and a second electrode 42 stacked with each other. Wherein, the first electrode 12 and the second electrode 42 are both ITO thin films, and the material of the first carrier substrate 11 and the second carrier substrate 41 may be transparent material such as glass or plastic.

By adjusting the magnitude of the voltage applied to the liquid crystal material layer 3 between the first electrode layer 1 and the second electrode layer 4, the deflection angle of the liquid crystal molecules in the liquid crystal material layer 3 is changed. Therefore, the value of neff is adjusted to achieve the purpose of controlling the difference between niso and neff, that is, controlling the occurrence and the strength of the viewing angle diffusion modulation of the optical film.

In some embodiments, the optical film further comprises a plurality of support pads 5, each of which is disposed between two of the groove structures 21 adjacent to each other, and each of the support pads 5 is located between the isotropic optical material layer 2 and the second electrode layer 4. The disposition of the support pad 5 does not affect the filling of the liquid crystal material layer 3 into each of the groove structures 21 and the connection of the liquid crystal material in each of the groove structures 21.

Specifically, the support pad 5 which is directly in contact with the liquid crystal molecules of the liquid crystal material layer 3, is made of a major material including an ultraviolet-curable resin. A cross-sectional shape of the support pad 5 can be circular or trapezoidal. The support pad 5 is used to maintain the thickness of the liquid crystal material layer 3, so as to avoid partial collapse of the isotropic optical material layer 2 and a non-uniform thickness of the liquid crystal material layer 3.

In some embodiments, the optical film further comprises a plurality of first alignment films 6 and a second alignment film 7. Each of the first alignment films 6 is disposed on a bottom surface of one of the groove structures. The second alignment film 7 is stacked on a surface of the second electrode layer 4 close to the liquid crystal material layer 3. In other words, the second alignment film 7 is a full-surface structure, and the second alignment film 7 is disposed on a surface of the second electrode 42 close to the liquid crystal material layer 3. The liquid crystal molecule of the liquid crystal material layer 3 are oriented by techniques known in the art, such as rubbing alignment, light control alignment, etc. There is no particular limitation about the method of liquid crystal molecule alignment.

The material of the first alignment film 6 and the second alignment film 7 is a polymer, and polyimide is preferably used as an example in one embodiment of the present disclosure. The first alignment film 6 and the second alignment film 7 are used to orient the liquid crystal molecules of the liquid crystal material layer 3. Preferably in the present embodiment, the orientation of the liquid crystal molecules of upper liquid crystal material layer 3, which is oriented by the first alignment film 6, is consistent with the orientation of the liquid crystal molecules of lower liquid crystal material layer 3 oriented by the first alignment film 7.

In some embodiments, a section of each of the groove structures in a vertical bottom-up direction is an irregular shape having a left half and a right half being symmetrical to each other, and a width of the section of each of the groove structures decreases gradually.

Preferably, the section of each of the groove structures includes a first isosceles trapezoid, a second isosceles trapezoid, and a third isosceles trapezoid in the vertical bottom-up direction, wherein a base angle of the second isosceles trapezoid is greater than a base angle of the third isosceles trapezoidal surface, and the base angle of the third isosceles trapezoidal surface is greater than a base angle of the first isosceles trapezoid.

Figure 3:
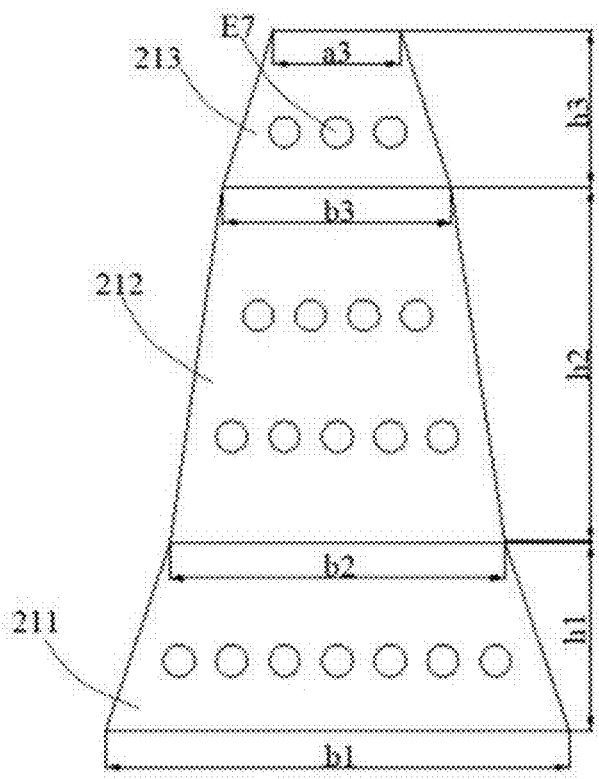
FIG. 3 is a schematic diagram showing each groove structure according to one embodiment of the present disclosure.

For instance, the liquid crystal molecules of the liquid crystal material layer 3 are positive nematic liquid crystals E7, and the ordinary refractive index(no) of E7 is 1.517, while the extraordinary refractive index(ne) is 1.741. Each of the groove structures 21 has a depth of 18.8 microns, and is filled with E7. As shown in FIG. 3, the section of each of the groove structures 21 along the length direction of the optical film is bell-shaped, and the section of each of the groove structures includes a first isosceles trapezoid 211, a second isosceles trapezoid 212, and a third isosceles trapezoid 213 in the vertical bottom-up direction, wherein a base angle of the second isosceles trapezoid is greater than a base angle of the third isosceles trapezoidal surface, and the base angle of the third isosceles trapezoidal surface is greater than a base angle of the first isosceles trapezoid.

A length b1 of the bottom of the first isosceles trapezoid 211 is 18.94 microns, and a height h1 is 3.51 microns. A length of the bottom b2 of the second isosceles trapezoid 212, which is also a length a1 of the top of the first isosceles trapezoid 211 is 12.64 microns, and the height h2 of the second isosceles trapezoid 212 is 12.71 microns. A length b3 of the bottom of the third isosceles trapezoid 213, which is also a length of the top a2 of the second isosceles trapezoid 212 is 10.26 microns, a length a3 of the top of the third isosceles trapezoid is 7.12 microns, and the height h3 is 2.58 microns.

Figure 4:
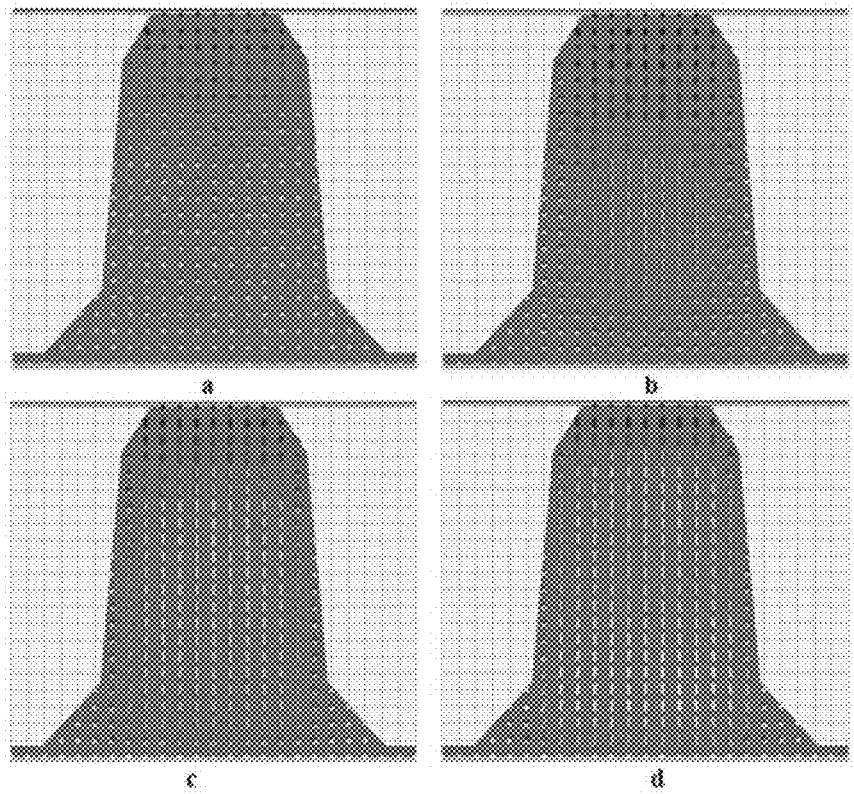
FIG. 4 is a diagram showing a liquid crystal director distribution of a liquid crystal material layer under different driving voltages according to one embodiment of the present disclosure.

As shown in FIG. 3, when no driving voltage is applied to the liquid crystal material layer 3 between the first electrode layer 1 and the second electrode layer 4, all liquid crystal molecular long axes in the liquid crystal material layer 3 are oriented in the same direction. In other words, the long axes of all liquid crystal molecules are parallel to the width direction of the optical film, while the equivalent refractive index of each liquid crystal molecule is equal at this time in an ideal state. That is to say, the liquid crystal material layer 3 has a constant equivalent refractive index (neff) with respect to incident light, and it is equal to the equivalent refractive index (niso) of the isotropic optical material layer 2, and then the optical film does not have a viewing angle modulation effect. It should be noted that in practical applications, there may be a slight deviation. That is, when the driving voltage is not applied, the values of neff and niso may not be absolutely equal, and the difference between niso and neff value may be about zero, but the viewing angle modulation effect of the optical film is weak. Compared with the existing viewing angle diffusion film, the optical film can still greatly reduce the light leakage at the front viewing angle of the liquid crystal display panel in the dark state and improve the contrast ratio of the liquid crystal display panel at the front viewing angle When a driving voltage is applied to the liquid crystal material layer 3 between the first electrode layer 1 and the second electrode layer 4 apply, each liquid crystal molecule is deflected under the effect of an electrical field. As shown in FIG. 4, each of FIGS. 4-a, 4-b, 4-c, and 4-d shows the liquid crystal director distribution of the liquid crystal material layer 3 under the driving voltages of 2V, 3V, 5V, and 8V respectively. When the driving voltage is getting greater, the larger deflection angle is preserved in the liquid crystal molecules to make the long axes of the liquid crystal molecules tend to be parallel to the direction of the electrical field lines. When the electric field strength is sufficiently large, the long axes of all liquid crystal molecules are parallel to the electrical field lines. In other words, all liquid crystal molecules are parallel to the electrical field lines, and all liquid crystal molecules are vertical. According to the director data of each liquid crystal molecule under different driving voltages, the equivalent refractive index nx of each liquid crystal molecule under different driving voltages can be calculated by the following formula (1).

$$n_x = \frac{n_e n_o}{\sqrt{n_o^2 + (n_e^2 - n_o^2)\sin^2(\theta)}} \quad (1)$$

In the above formula (1), θ indicates a angle between the long axis of the liquid crystal molecules and the width direction of the optical film, $n_e$ indicates the extraordinary refractive index value of the liquid crystal molecules, and $n_o$ indicates the ordinary refractive index value of the liquid crystal molecules. In the present embodiment, $n_e$ is 1.741, $n_o$ is 1.517.

Figure 5:
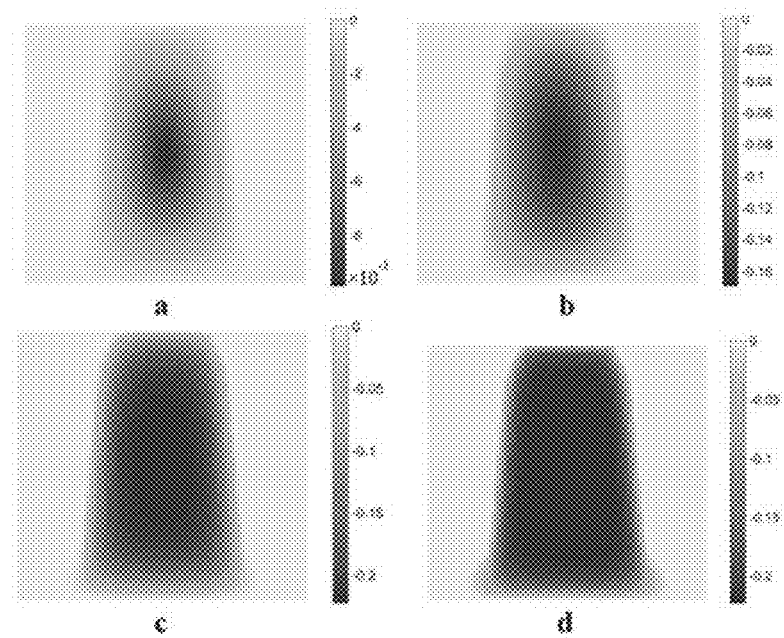
FIG. 5 is a distribution diagram showing the differences between niso and neff of an optical film under different driving voltages according to one embodiment of the present disclosure.

As shown in FIG. 5, the numerical distribution of neff can be obtained according to the equivalent refractive index of each liquid crystal molecule, and then a distribution diagram showing the difference between the niso and neff of the optical film under different driving voltages is obtained. Each of FIGS. 5-a, 5-b, 5-c and 5-d is the distribution diagram of the difference between the niso and neff of the optical film under 2V, 3V, 5V and 8V driving voltages respectively. With the increase of the driving voltage, the difference distribution between niso and neff also increases, which means that the viewing angle modulation action of the optical film is getting stronger and stronger. Conversely, as the driving voltage decreases, the viewing angle modulation action of the optical film becomes weaker and weaker until the driving voltage is zero (ie: no driving voltage is applied) in an ideal state, and then the difference between niso and neff is zero, which means there is no viewing angle modulation effect of the optical film.

Figure 6:
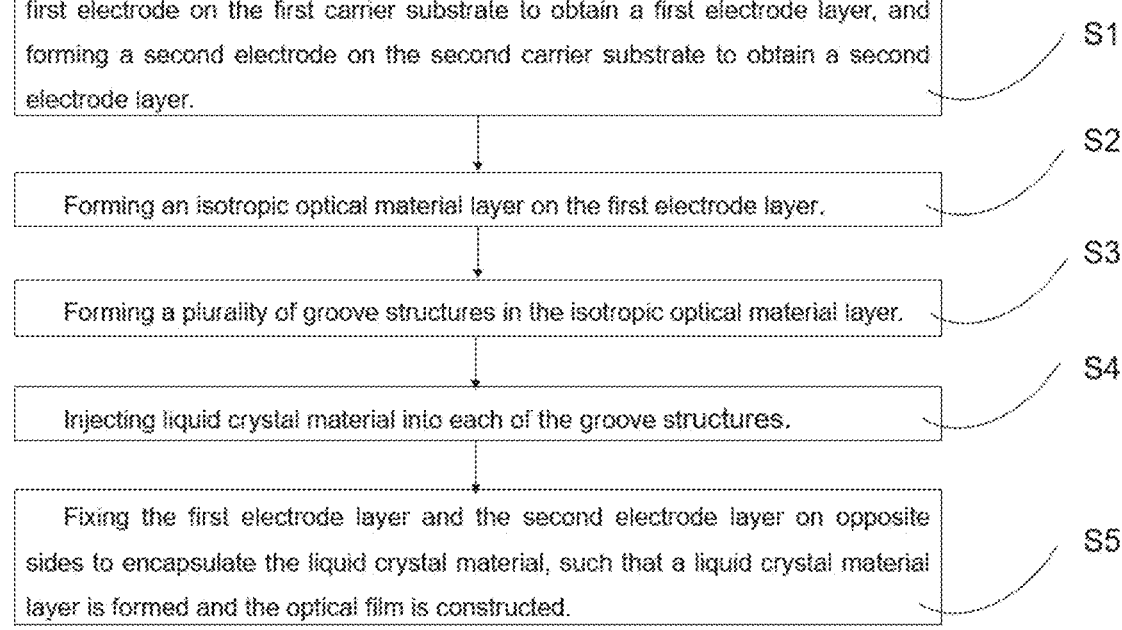
FIG. 6 is a schematic flowchart of a method for manufacturing an optical film according to one embodiment of the present disclosure.

In a second aspect, the present disclosure provides a method for manufacturing the optical film described in the first aspect. As shown in FIG. 6, the method comprises the following S1-S5 steps.

(S1) providing a first carrier substrate and a second carrier substrate, forming a first electrode on the first carrier substrate to obtain a first electrode layer, and forming a second electrode on the second carrier substrate to obtain a second electrode layer.

Specifically, the first electrode and the second electrode can be manufactured by techniques known in the art, such as a coating process or an electronic printing process. The coating process may be spraying, spin coating, or the like. The thicknesses of the first electrode layer and the second electrode layer are not specifically limited, and it can be selected according to actual needs.

(S2) forming an isotropic optical material layer on the first electrode layer.

Specifically, the first electrode and the second electrode can be manufactured by techniques known in the art, such as a coating process or an electronic printing process. The coating process may be spray coating, spin coating, or the like. The thickness of the isotropic optical material layer is 10-200 microns.

(S3) forming a plurality of groove structures in the isotropic optical material layer.

Specifically, the groove structures can be manufactured by techniques known in the art, such as etching process, or the like. The plurality of groove structures are arranged at equal intervals. A section of each of the groove structures is an irregular shape having a left half and a right half being symmetrical to each other, and a width of the section of each of the groove structures decreases gradually in a vertical bottom-up direction.

(S4) injecting liquid crystal material into each of the groove structures.

Specifically, the liquid crystal material is injected by techniques known in the art, such as liquid crystal drop filling process, or the like. Material of the liquid crystal material layer is nematic liquid crystal or blue phase liquid crystal.

(S5) fixing the first electrode layer and the second electrode layer on opposite sides to encapsulate the liquid crystal material, such that a liquid crystal material layer is formed and the optical film is constructed.

Specifically, the first electrode layer and the second electrode layer can be fixed on opposite sides by techniques known in the art such as vacuum aligning process. In order to prevent the overflow of liquid crystal and the intrusion of water vapor in the vacuum aligning process, the surroundings of the first electrode layer and the second electrode layer may be further sealed with a frame glue. The frame glue is selected from existing products, such as thermosetting resins and/or UV-curable resins.

In some embodiments, before the S5 step, the manufacturing method further comprises: forming a plurality of support pads on the second electrode layer, wherein positions of the support pads respectively correspond to positions of the isotropic optical material layer disposed between the groove structures adjacent to each other.

Specifically, the support pads are manufactured by techniques known in the art, such as photolithographic technology. Major material of the support pads including an ultraviolet-curable resin, which may be in the shape of a sphere or a column.

In some embodiments, before the S4 step, the manufacturing method further comprises: forming a first alignment film on a bottom surface of each of the groove structures, and forming a second alignment film on the second electrode layer.

Specifically, polyimide is preferably used as the material of the first alignment film and the second alignment film. The first alignment film and the second alignment film may be manufactured by the support pads are manufactured by techniques known in the art. As an example, polyimide layers are formed on both the surface of the bottom of each groove structure and the surface of the second electrode layer, and then directional grooves are constructed by rubbing on the polyimide layer through a rubbing process. As another example, at first, photosensitive monomer is doped into the polyimide, and then the polyimide doped with the photosensitive monomer is coated on the surface of the bottom of each groove structure and the surface of the second electrode layer, and after curing, a polarized ultraviolet light process is performed to complete the light alignment of the liquid crystal molecules.

In a third aspect, the present embodiment provides an application of the optical film the first aspect described in a display panel. The optical film the first aspect described can be applied to a display panel as a viewing angle diffusion film. That is, the optical film is located on a light emitting surface of the display panel.

Specifically, some examples of the display panel include LCD panels and non-LCD panels such as organic light-emitting diode (OLED) display panel, micro light emitting diode (Micro-LED) display panel, quantum dot light emitting diodes (QLED) display panel, etc. The mode of the liquid crystal display panel may be conventional, such as a twisted nematic (TN) display mode, a vertical alignment (VA) display mode, an in-plane switching (IPS) display mode, etc. The mode of the liquid crystal display panel can be selected according to actual needs, and it is not specifically limited here.

EXAMPLE

A LCD panel, comprising:
a first substrate including a plurality of pixels;
a second substrate arranged opposite to the first substrate;
a liquid crystal layer filled between the first substrate and the second substrate;
a first polarizer disposed on a surface of the first substrate away from the liquid crystal layer;
a second polarizer disposed on a surface of the second substrate away from the liquid crystal layer; and
the optical film described in the first aspect, wherein the optical film is disposed on a surface of the first polarizer away from the first substrate, and wherein positions of the groove structures in the optical film respectively correspond to positions of the pixels.

Preferably, the first substrate is a color film (CF) substrate, and the second substrate is a thin film transistor (TFT) array substrate. The driving voltage applied between the first electrode layer and the second electrode layer of the optical film is provided by an external power or the TFT array substrate.

Preferably, the mode of the LCD panel is TN display mode. Particularly preferably, when no electrical field is applied to the TFT array substrate, the pixel appears in a dark state; and when an electrical field is applied to the TFT array substrate, the pixel appears in a bright state. The gray scale of the pixel is adjusted by the magnitude of the electrical field applied to the TFT array substrate.

When the pixel appears in a dark state, no driving voltage is applied to the liquid crystal material layer between the first electrode layer and the second electrode layer. In an ideally state, the optical film does not have a viewing angle modulation function, thereby completely eliminating the negative effect of the existing viewing angle diffusion film. In other words, the light leakage of the super viewing angle (above 60 degree viewing angle) will not be modulated to the front viewing angle in the dark state, so that the light leakage in the dark state and the contrast ratio diminution of the front viewing angle are effectively avoided.

When the pixel appears in the bright state, the TFT array substrate provides an electrical field with a corresponding intensity to the pixel according to the difference in the display gray scale. In the optical film, a fixed driving voltage is applied to the liquid crystal material layer between the first electrode layer and the second electrode layer so that the value of niso is greater than the value of neff That is, the optical film has the viewing angle modulation function, and it can modulate part of light from the front viewing angle to a large viewing angle (such as a 45-degree viewing angle). In such basis, the optical film can effectively improve the display brightness at the large viewing angle and realize the free switching between the front viewing angle mode and the large viewing angle viewing mode.

Comparative Example 1

This comparative example provides a liquid crystal display panel. The only difference between the present comparative example and the example in the third aspect is that the side of the first polarizer facing away from the color filter substrate is not provided with an optical film having a viewing angle modulation function.

Comparative Example 2

Figure 1:
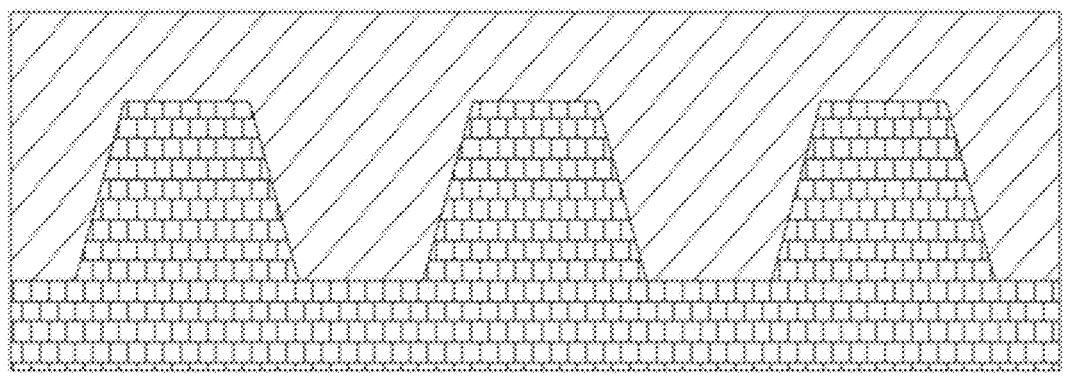
FIG. 1 is a cross-sectional view of a viewing angle diffusion film in a longitudinal direction according to prior art.

This comparative example provides a liquid crystal display panel. The only difference between the present comparative example and the example in the third aspect is that a viewing angle diffusion film in the prior art (as shown is FIG. 1) is disposed on a side of the first polarizer facing away from the color filter substrate.

Figure 7:
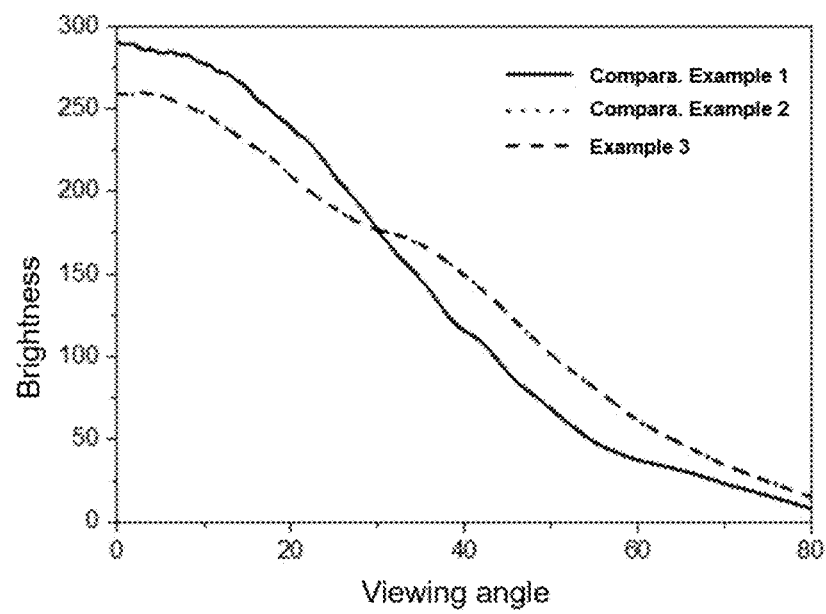
FIG. 7 is a graph showing brightness changes of an LCD panel of one embodiment of the present disclosure, an LCD panel of an comparative example 1, and an LCD panel of the comparative example 2 from a front viewing angle (0 degree) to a viewing angle of 80 degrees.
Figure 8:
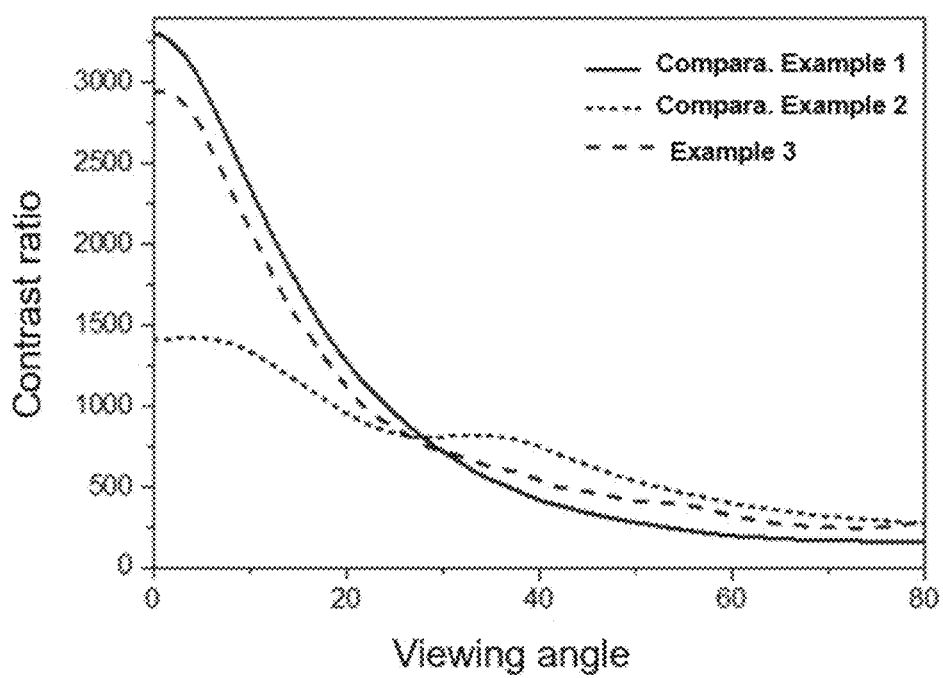
FIG. 8 is a graph showing contrast ratio changes of an LCD panel of one embodiment of the present disclosure, an LCD panel of the comparative example 1, and an LCD panel of the comparative example 2 from a front viewing angle (0 degree) to a viewing angle of 80 degrees.

A brightness test and a contrast test of the LCD panels of the example described in the third aspect, the comparative example 1 and the comparative example 2 are performed from a front viewing angle (0 degree) to a viewing angle of 80 degree. Results as shown in FIG. 7 and FIG. 8 are obtained. The brightness test and the contrast test may be conducted by using techniques known in the art, and is not repeated here.

As shown in FIG. 7, the brightness from the front viewing angle (0°) to 80° viewing angle of the LCD panel of Comparative Example 2 and the LCD panel the described in the example of the third aspect are consistent. The brightness at the large viewing angle of 30°-80° is significantly superior to that of Comparative Example 1. The optical film of the embodiment of the present disclosure has the same effect on light intensity distribution in the bright state as the existing viewing angle diffusion film.

As shown in FIG. 8, compared to the LCD panel of Comparative Example 2, the contrast ratio of the LCD panel from the example described in the third aspect at front viewing angle (0°) is about doubled. In other words, compared to the existing viewing angle diffusion film, the optical film of the present disclosure greatly improves the light leakage in the dark state at the front viewing angle. The optical film not only retains the positive effects of the existing viewing angle diffusion film in the bright state to improve the brightness of the large viewing angle display, but also eliminate the negative effects, such as the light leakage at the front viewing angle in the dark state and the contrast ratio diminution at the front viewing angle.

While the present disclosure has been described with the aforementioned preferred embodiments, it is preferable that the above embodiments should not be construed as limiting of the present disclosure. On the contrary, the present disclosure includes all the modifications and variations without departing from the spirit and scope of the present disclosure.

What is claimed is:

1. An optical film, comprising:
    a first electrode layer, an isotropic optical material layer, a liquid crystal material layer, and a second electrode layer that are sequentially stacked;
    wherein a plurality of groove structures are disposed in the isotropic optical material layer, and each of the groove structures is filled with the liquid crystal material layer;
    wherein an ordinary refractive index of the liquid crystal material layer is less than an ordinary refractive index of the isotropic optical material layer, and an extraordinary refractive index of the liquid crystal material layer is equal to an extraordinary refractive index of the isotropic optical material layer;
    wherein a section of each of the groove structures in a vertical bottom-up direction is an irregular shape having a left half and a right half being symmetrical to each other, and a width of the section of each of the groove structures decreases gradually; and
    wherein the section of each of the groove structures includes a first isosceles trapezoid, a second isosceles trapezoid, and a third isosceles trapezoid in the vertical bottom-up direction, wherein a base angle of the second isosceles trapezoid is greater than a base angle of the third isosceles trapezoidal surface, and the base angle of the third isosceles trapezoidal surface is greater than a base angle of the first isosceles trapezoid.

2. The optical film as claimed in claim 1, wherein the first electrode layer includes a first carrier substrate and a first electrode stacked with each other, and the second electrode layer includes a second carrier substrate and a second electrode stacked with each other.

3. The optical film as claimed in claim 2, wherein the first electrode and the second electrode are transparent conductive films.

4. The optical film as claimed in claim 2, wherein material of first carrier substrate and the second carrier substrate is transparent glass or transparent plastic.

5. The optical film as claimed in claim 1, wherein the optical film comprises a plurality of support pads, each of which is disposed between two of the groove structures adjacent to each other, and each of the support pads is located between the isotropic optical material layer and the second electrode layer.

6. The optical film as claimed in claim 1, wherein the optical film further comprises a plurality of first alignment films and a second alignment film, wherein each of the first alignment films is disposed on a bottom surface of one of the groove structures, and wherein the second alignment film is stacked on a surface of the second electrode layer close to the liquid crystal material layer.

7. The optical film as claimed in claim 1, wherein material of the liquid crystal material layer is nematic liquid crystal or blue phase liquid crystal.

8. The optical film as claimed in claim 7, wherein a thickness of the liquid crystal material layer is 5-100 microns.

9. The optical film as claimed in claim 1, wherein material of the isotropic optical material layer is an ultraviolet photosensitive polymer material containing a resin.

10. The optical film as claimed in claim 9, wherein a thickness of the isotropic optical material layer is 10-200 microns.

11. The optical film as claimed in claim 1, wherein the plurality of groove structures are arranged at equal intervals.

12. A manufacturing method for an optical film, comprising steps of:
    providing a first carrier substrate and a second carrier substrate, forming a first electrode on the first carrier substrate to obtain a first electrode layer, and forming a forming a second electrode on the second carrier substrate to obtain a second electrode layer;
    forming an isotropic optical material layer on the first electrode layer;
    forming a plurality of groove structures in the isotropic optical material layer;
    injecting liquid crystal material into each of the groove structures; and
    fixing the first electrode layer and the second electrode layer on opposite sides to encapsulate the liquid crystal material, such that a liquid crystal material layer is formed and the optical film is constructed;
    wherein a section of each of the groove structures in a vertical bottom-up direction is an irregular shape having a left half and a right half being symmetrical to each other, and a width of the section of each of the groove structures decreases gradually; and
    wherein the section of each of the groove structures includes a first isosceles trapezoid, a second isosceles trapezoid, and a third isosceles trapezoid in the vertical bottom-up direction, wherein a base angle of the second isosceles trapezoid is greater than a base angle of the third isosceles trapezoidal surface, and the base angle of the third isosceles trapezoidal surface is greater than a base angle of the first isosceles trapezoid.

13. The manufacturing method as claimed in claim 12, wherein before fixing the first electrode layer and the second electrode layer on opposite sides to encapsulate the liquid crystal material, the manufacturing method further comprises:

forming a plurality of support pads on the second electrode layer, wherein positions of the support pads respectively correspond to positions of the isotropic optical material layer disposed between the groove structures adjacent to each other.

14. The manufacturing method as claimed in claim 12, wherein before injecting the liquid crystal material into each of the groove structures, the manufacturing method further comprises:

forming a first alignment film on a bottom surface of each of the groove structures, and forming a second alignment film on the second electrode layer.

15. A display panel, comprising: an optical film disposed on a light emitting surface of the display panel; wherein the optical film comprises a first electrode layer, an isotropic optical material layer, a liquid crystal material layer, and a second electrode layer that are sequentially stacked;

wherein a plurality of groove structures are disposed in the isotropic optical material layer, and each of the groove structures is filled with the liquid crystal material layer;

wherein an ordinary refractive index of the liquid crystal material layer is less than an ordinary refractive index of the isotropic optical material layer, while an extraordinary refractive index of the liquid crystal material layer is equal to an extraordinary refractive index of the isotropic optical material layer;

wherein a section of each of the groove structures in a vertical bottom-up direction is an irregular shape having a left half and a right half being symmetrical to each other, and a width of the section of each of the groove structures decreases gradually; and wherein the section of each of the groove structures includes a first isosceles trapezoid, a second isosceles trapezoid, and a third isosceles trapezoid in the vertical bottom-up direction, wherein a base angle of the second isosceles trapezoid is greater than a base angle of the third isosceles trapezoidal surface, and the base angle of the third isosceles trapezoidal surface is greater than a base angle of the first isosceles trapezoid.

16. The display panel as claimed in claim 15, wherein the display panel is LCD panel comprising:

a first substrate including a plurality of pixels;

a second substrate arranged opposite to the first substrate;

a liquid crystal layer filled between the first substrate and the second substrate;

a first polarizer disposed on a surface of the first substrate away from the liquid crystal layer;

a second polarizer disposed on a surface of the second substrate away from the liquid crystal layer; and an optical film as described in the first aspect, wherein the optical film is disposed on a surface of the first polarizer away from the first substrate, and wherein positions of the groove structures in the optical film respectively correspond to positions of the pixels.

17. The display panel as claimed in claim 16, wherein the first substrate is a color film substrate, and the second substrate is a thin film transistor array substrate.

18. The display panel as claimed in claim 16, wherein the display panel has a twisted nematic display mode.

* * * * *